Aug. 17, 1926.

J. J. BARRY

FISH SKINNING MACHINE

Filed August 29, 1925   2 Sheets-Sheet 1

1,596,649

INVENTOR
James J. Barry
BY
King & Schlatt
ATTORNEYS

Aug. 17, 1926.
J. J. BARRY
1,596,649
FISH SKINNING MACHINE
Filed August 29, 1925    2 Sheets-Sheet 2
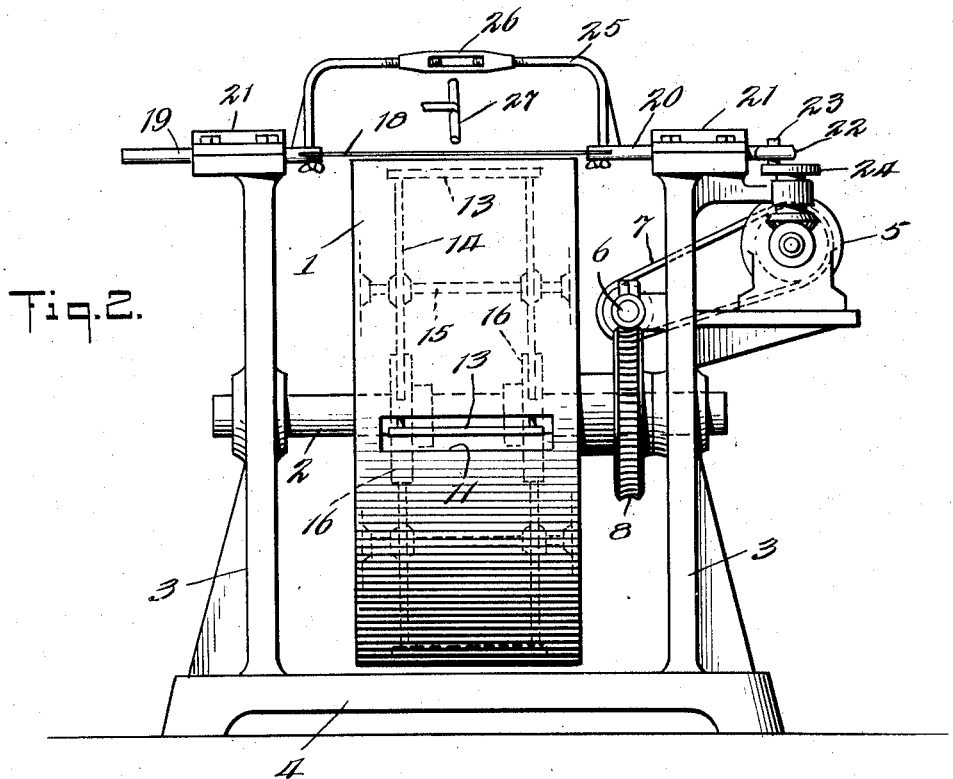
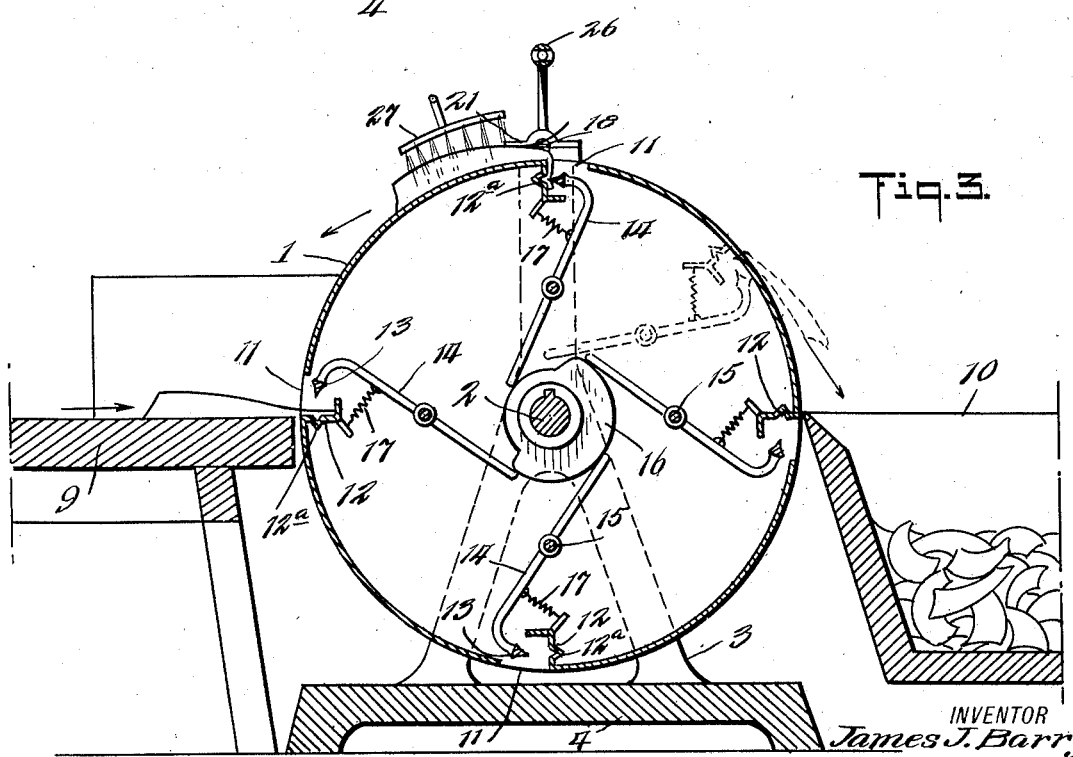
INVENTOR
James J. Barry
BY
King & Schlatt
ATTORNEYS Patented Aug. 17, 1926.

1,596,649

UNITED STATES PATENT OFFICE.

JAMES J. BARRY, OF GLOUCESTER, MASSACHUSETTS, ASSIGNOR TO GENERAL SEA-FOODS CORPORATION OF DELAWARE.

FISH-SKINNING MACHINE.

Application filed August 29, 1925. Serial No. 53,289.

This invention relates to fish skinning machines, and particularly to such machines which are power actuated and automatic in the performance of the skinning operation. While the machine of the present disclosure is intended primarily for skinning of fish fillets, and it is for such use that I prefer to carry out the invention, it is to be understood that the invention is applicable to skinning of whole fish as well as parts of fish or fillets and in the following specification the term "fish" is employed in its general sense to cover the fish in whole or in part.

The objects of the invention are to provide a machine which will skin fish uniformly which vary considerably in size; to effectively remove the skin without injury to the fish; to automatically grip and release the fish before and after the skinning operation respectively; to avoid possible injury to the knife by the gripping mechanism; to impart a proper cutting motion to the knife simultaneously with the advancing motion imparted to the fish; to enable the knife to be properly tensioned; to secure simplicity of construction and operation; and to obtain other advantages and results as may be brought out in the following description.

Referring to the accompanying drawings in which like numerals of reference indicate similar parts throughout the several views;

Figure 2 is a front elevation of a machine; and

Figure 3 is a central vertical section from front to rear of the machine.

Figure 1:
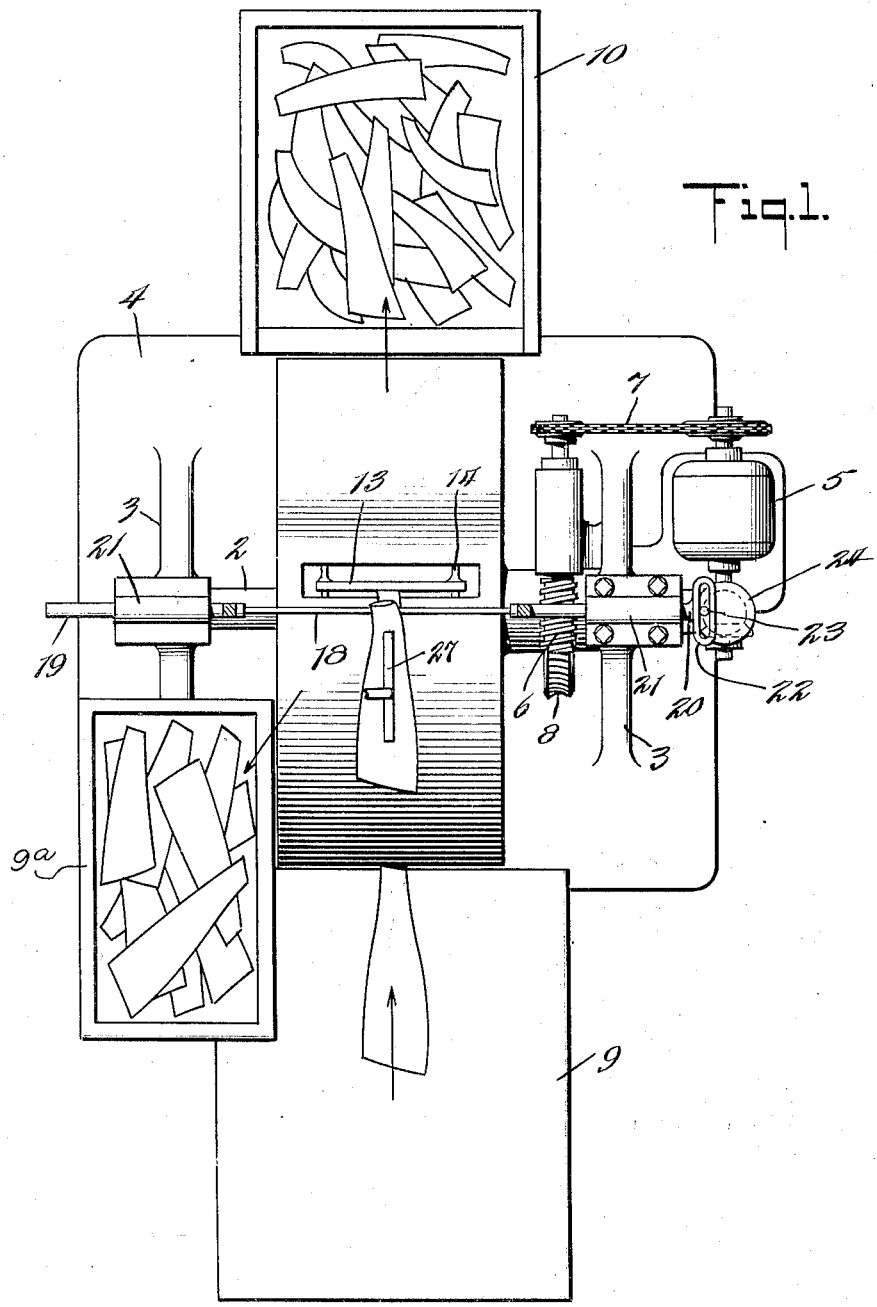
Figure 1 is a plan of a skinning machine embodying my invention, with the knife tensioning means omitted so as to show the knife in operation cutting the skin from a fish fillet.

In the specific embodiment of the invention illustrated in said drawings, the reference numeral 1 indicates a rotatable drum mounted on a shaft 2 carried in suitable bearings in uprights 3 from a base 4. Said drum is adapted to be continuously rotated by suitable power actuating means which in the present showing comprises a motor 5 driving a worm 6 through sprocket chain 7 and associated sprockets, the worm 6 driving a worm wheel 8 fast upon drum shaft 2. Rotation of the drum is preferably in such direction that the upper part moves from front to rear during operation.

At the front of the machine is suitable means such as a table 9 from which the fish may be fed to the drum, and at the rear of the machine is a suitable receiving means for the skins such as hopper 10 indicated. However, it is to be understood that these devices are only illustrative of any means for feeding or receiving the fish. Again it may be emphasized that I use the term "fish" in its general sense including fish in whole or in part.

The fish are automatically gripped at the front of the machine and held on the drum so as to be carried over to the top of the machine, or thereabout, where they are separated from the skins by the action of the knife (subsequently described) after which the skinned fish slides backward and sideways off the drum to a suitable receiving means 9ª. The skins are carried to the rear of the machine where they are automatically released and dropped to the receiving means or hopper 10.

The means by which the fish are gripped may be varied considerably within the scope of the invention; but should be of such nature as not to project above the surface of the drum while gripping the fish. As one embodiment of a suitable gripping means, I have shown the drum transversely slotted, as at 11, sufficient in size to conveniently receive the tail end of the fish. The slot 11 is provided with an inwardly projecting flange 12 upon which the tail will rest when inserted in the slot said flange having a depression 12ª. A suitable clamp is arranged to grip the tail end of the fish automatically in the depression 12ª of this flange 12, said clamp being shown herein as a cross member 13 extending longitudinally with respect to the slot and mounted on the ends of the drum and pivoted as at 15 to suitable supports on the drum (see Figure 2). The inner ends of one or both arms 14 extend inwardly beyond the pivot 15 and engage a cam 16 for operating the grip bar. Said cam or cams 16 are so arranged as to cause the grip bar to drop onto the tail end of the fish as the slot leaves the table 9 and remain in gripping contact with said tail end of the fish until the fish has completely passed the uppermost position and the knife (as described below). The cam is preferably operated to release the fish skin (as indicated in dotted lines on Figure 3) slightly before the skin reaches the hopper 10, enabling the skin to drop into the hopper or other receiving means. As shown in the drawings, the cams operate to positively remove the grip bar from the tail end of the fish and springs 17 are provided to actuate the grip bar toward the fish when the cam permits, but this arrangement may be varied if so desired.

A knife 18 is arranged to engage the fish during the period that the tail end of the fish is being gripped, it being noted that the fish is held with the skin to be removed against the drum. The knife engages the fish at the point where the fish protrudes from the slot in the drum and cuts through the fish as far as the skin. The knife then passes along between the fish flesh and the inner side of the skin. By this operation the fish flesh is separated from the skin and the pressure of the knife as the end of the fish is reached serves to turn the fish over which thereupon slides backwardly away from the knife and falls, or if necessary is guided, off the side of the drum into the receiving means 9ª. The construction herein shown provides a knife at the uppermost part of the drum suitably spaced therefrom and extending transversely across the drum. The knife is secured at its ends to suitable slidable members 19, 20 supported in bearings 21 at the top of uprights 3. One of these slidable members, as 20, is actuated by the motor 5, the present showing contemplating a slotted crosshead 22 on the outer end of said slidable member, the slot of said crosshead receiving a stud 23 projecting eccentrically from a disc 24 driven by the motor. This or an equivalent construction obtains a rapid reciprocation of the knife.

Proper tension is maintained on the knife by an adjustable bridge 25 extending from one slidable member to the other and including a turn-buckle 26 or other adjusting means. This adjustment is so manipulated as to enable the knife to flex in passing thru the fish and thus follow the course of least resistance between the fish flesh and skin. The reciprocal motion of the knife combined with the advancing motion imparted to the fish by the drum will therefore operate to skin the fish automatically.

A sprinkling device 27 for the purpose of washing the fish and lubricating the knife, may be placed adjacent the knife as indicated or elsewhere as found most desirable or necessary.

Obviously detail changes and modifications may be made in the construction and use of my improved fish skinning machine without departing from the spirit or scope of the invention, and I do not wish to be understood as limiting myself to the exact structure shown or described except as set forth in the following claims when construed in the light of the prior art.

Having thus described the invention, I claim:—

1. A fish skinning machine comprising a knife, and means for obtaining relative movement between said knife and fish to be skinned longitudinally with respect to the fish.

2. A fish skinning machine comprising a knife, and means for obtaining relative movement between said knife and fish to be skinned longitudinally with respect to the knife.

3. A fish skinning machine comprising a knife, and means for obtaining relative movement between said knife and fish to be skinned both longitudinally with respect to the fish and longitudinally with respect to the knife.

4. A fish skinning machine comprising a knife, and means for passing fish past the knife so as to peel the skin from the fish.

5. A fish skinning machine comprising a knife, means for reciprocating said knife, and means for passing fish past said reciprocating knife so as to peel the skin from the fish.

6. A fish skinning machine comprising a rotatable drum, means for holding fish on the drum, and means for skinning said fish while held on the drum.

7. A fish skinning machine comprising a rotatable drum, means for holding the tail end of fish to be skinned and thereby hold the fish on the drum, and means for skinning said fish while held on the drum.

8. A fish skinning machine comprising a drum, a releasable gripping means on said drum for holding fish, and means for automatically operating said gripping means.

9. A fish skinning machine comprising a drum having a slot adapted to receive the tail end of fish to be skinned, and means in said slot for gripping said tail end of the fish.

10. A fish skinning machine comprising a drum having a slot, a flange projecting inwardly from said slot, and gripping means cooperating with said flange for engaging fish to be skinned and holding the fish on the drum.

11. A fish skinning machine comprising a drum having a slot, a flange projecting inwardly from said slot, and a gripping member pivotally mounted to swing toward and away from said flange for engaging fish to be skinned and holding the fish on the drum.

12. A fish skinning machine comprising a drum having a slot, a flange projecting inwardly from said slot, gripping means cooperating with said flange for engaging fish to be skinned and holding the fish on the drum, and means for automatically operating said gripping means at predetermined positions of said drum.

13. A fish skinning machine comprising a drum having a slot, a flange projecting inwardly from said slot, a gripping member pivotally mounted to swing toward and away from said flange for engaging fish to be skinned and holding the fish on the drum, and means for automatically operating said gripping means at predetermined positions of said drum.

14. A fish skinning machine comprising a drum having a slot, a flange projecting inwardly from said slot, a gripping member pivotally mounted to swing toward and away from said flange for engaging fish to be skinned and holding the fish on the drum, means for automatically operating said gripping means at predetermined positions of said drum; and a knife positioned in the path of movement of the fish while so held on the drum.

15. A fish skinning machine comprising a drum having a slot, a flange projecting inwardly from said slot, gripping means cooperating with said flange for engaging fish to be skinned and holding the fish on the drum, means for automatically operating said gripping means at predetermined positions of said drum, and a knife positioned in the path of movement of the fish while so held on the drum.

16. A fish skinning machine comprising a drum having a slot, a flange projecting inwardly from said slot, a gripping member pivotally mounted to swing toward and away from said flange for engaging fish to be skinned and holding the fish on the drum, and a knife positioned in the path of movement of the fish while so held on the drum.

17. A fish skinning machine comprising a drum having a slot, a flange projecting inwardly from said slot, gripping means cooperating with said flange for engaging fish to be skinned and holding the fish on the drum, and a knife positioned in the path of movement of the fish while so held on the drum.

18. A fish skinning machine comprising a drum having a slot adapted to receive the tail end of fish to be skinned, means in said slot for gripping said fish, and a knife adjacent said drum adapted to engage and skin the fish while held by said gripping means.

19. A fish skinning machine comprising means for holding fish to be skinned, and a knife associated with said fish-holding means for skinning the fish while held by said means.

20. A fish skinning machine comprising means for holding fish to be skinned, and a reciprocating knife associated with said fish-holding means for skinning the fish while held by said means.

21. A fish skinning machine comprising a drum for holding fish to be skinned with the skin next to the drum, a knife associated with said drum positioned in the path of movement of the fish adapted to cut through the fish and pass between the fish flesh and fish skin thereby severing the skin from the flesh.

22. A fish skinning machine comprising means for holding fish to be skinned, a knife associated with said fish-holding means for skinning the fish while held by said means, said knife being supported so as to flex and follow the contour of the fish.

23. A fish skinning machine comprising means for holding fish to be skinned, a reciprocating knife associated with said fish-holding means for skinning the fish while held by said means, and means for operating said knife under constant tension so as to enable the knife to flex and follow the contour of the fish.

JAMES J. BARRY.